United States Patent
Hassan

(10) Patent No.: US 10,437,798 B2
(45) Date of Patent: Oct. 8, 2019

(54) FULL SYSTEM SIMULATOR AND MEMORY-AWARE SPLAY TREE FOR IN-MEMORY DATABASES IN HYBRID MEMORY SYSTEMS

(71) Applicant: SAP SE, Walldorf (DE)

(72) Inventor: Ahmad Hassan, Belfast (IE)

(73) Assignee: SAP SE, Walldorf (DE)

( * ) Notice: Subject to any disclaimer, the term of this patent is extended or adjusted under 35 U.S.C. 154(b) by 201 days.

(21) Appl. No.: 15/214,102

(22) Filed: Jul. 19, 2016

(65) Prior Publication Data

US 2018/0024997 A1 Jan. 25, 2018

(51) Int. Cl.
*G06F 16/21* (2019.01)
*G06F 16/245* (2019.01)
*G06F 16/22* (2019.01)

(52) U.S. Cl.
CPC ........ *G06F 16/214* (2019.01); *G06F 16/2246* (2019.01); *G06F 16/245* (2019.01)

(58) Field of Classification Search
CPC ............. G06F 17/303; G06F 17/30327; G06F 17/30424
See application file for complete search history.

(56) References Cited

U.S. PATENT DOCUMENTS

| | | | |
|---|---|---|---|
| 5,845,325 A | 12/1998 | Loo | |
| 6,157,955 A | 12/2000 | Narad et al. | |
| 6,195,731 B1 | 2/2001 | Bordaz et al. | |
| 6,760,721 B1 | 7/2004 | Chasen | |
| 6,952,664 B1 | 10/2005 | Lahiri et al. | |
| 7,181,578 B1 | 2/2007 | Guha | |
| 7,360,073 B1 | 4/2008 | Billstrom et al. | |
| 7,434,002 B1 | 10/2008 | Zedlewski et al. | |
| 7,624,381 B1 | 11/2009 | Czajkowski et al. | |
| 7,774,556 B2 | 8/2010 | Karamcheti et al. | |
| 7,840,397 B2 | 11/2010 | Chiou | |
| 7,958,329 B2 | 6/2011 | Holt | |
| 8,170,859 B1 | 5/2012 | Christensson et al. | |
| 8,185,471 B1 | 5/2012 | Walker et al. | |
| 8,214,191 B2 | 7/2012 | Ferren et al. | |

(Continued)

OTHER PUBLICATIONS

U.S. Appl. No. 14/704,461, Ahmad Hassan, filed May 5, 2015.

(Continued)

*Primary Examiner* — Ashish Thomas
*Assistant Examiner* — Dustin D Eyers
(74) *Attorney, Agent, or Firm* — Fish & Richardson P.C.

(57) ABSTRACT

Implementations of the present disclosure include methods, systems, and computer-readable storage mediums for receiving a key, the key corresponding to an object that is stored in a hybrid memory system, searching a SPLAY tree based on the key to identify a node of the SPLAY tree, determining a type of memory that the object is stored on in the hybrid memory system, the type of memory including one of a first type of memory and a second type of memory, selectively adjusting an endurance counter associated with the object based on a location of the node within the SPLAY tree, and the type of memory that the object is stored on in the hybrid memory system, and selectively migrating the object between the first memory type and the second memory type based on the EC associated with the object.

20 Claims, 6 Drawing Sheets

(56) References Cited

U.S. PATENT DOCUMENTS

| | | |
|---|---|---|
| 8,230,395 B1 | 7/2012 | Koh et al. |
| 8,456,905 B2 | 6/2013 | Kasorla |
| 8,572,051 B1 | 10/2013 | Chen et al. |
| 8,862,588 B1 * | 10/2014 | Gay .................. G06F 17/30336 |
| | | 707/741 |
| 8,868,537 B1 | 10/2014 | Colgrove et al. |
| 8,874,846 B2 | 10/2014 | Franceschini |
| 8,880,687 B1 | 11/2014 | Chandrachari et al. |
| 8,959,611 B1 | 2/2015 | Vincent |
| 8,966,462 B2 | 2/2015 | Gounares et al. |
| 9,043,530 B1 | 5/2015 | Sundaram et al. |
| 9,304,913 B2 | 4/2016 | Dong et al. |
| 9,348,539 B1 | 5/2016 | Saxena |
| 9,626,327 B2 | 4/2017 | Eilert et al. |
| 9,652,380 B2 | 5/2017 | Byun et al. |
| 9,672,158 B2 | 6/2017 | Karamcheti et al. |
| 9,712,538 B1 | 7/2017 | Vincent et al. |
| 9,720,925 B1 | 8/2017 | Lawson |
| 9,720,967 B2 | 8/2017 | Lee et al. |
| 9,740,438 B2 | 8/2017 | Hassan |
| 9,841,914 B2 | 12/2017 | Hassan |
| 9,846,550 B2 | 12/2017 | Muralimanohar |
| 1,008,318 A1 | 9/2018 | Hassan |
| 2001/0027387 A1 | 10/2001 | Miyake et al. |
| 2003/0033431 A1 | 2/2003 | Shinomiya |
| 2004/0184340 A1 | 9/2004 | Dwarkasdas |
| 2005/0097078 A1 | 5/2005 | Lohman et al. |
| 2005/0108447 A1 | 5/2005 | Thadani |
| 2006/0059474 A1 | 3/2006 | Bhansali et al. |
| 2006/0117299 A1 | 6/2006 | Goldsmith et al. |
| 2007/0050328 A1 | 3/2007 | Li |
| 2007/0050609 A1 | 3/2007 | Ferren et al. |
| 2007/0202473 A1 | 8/2007 | Koda |
| 2007/0226186 A1 | 9/2007 | Ewen et al. |
| 2008/0005476 A1 * | 1/2008 | Venkatesan ......... G06F 12/0802 |
| | | 711/118 |
| 2008/0034179 A1 | 2/2008 | Mewhinney et al. |
| 2008/0109592 A1 | 5/2008 | Karamcheti et al. |
| 2008/0140682 A1 | 6/2008 | Grosset et al. |
| 2008/0288718 A1 | 11/2008 | Hepkin et al. |
| 2008/0288742 A1 | 11/2008 | Hepkin et al. |
| 2009/0049234 A1 | 2/2009 | Oh et al. |
| 2009/0157952 A1 | 6/2009 | Kim et al. |
| 2009/0157964 A1 | 6/2009 | Kasorla |
| 2009/0182976 A1 | 7/2009 | Agesen et al. |
| 2009/0307462 A1 | 12/2009 | Fleming et al. |
| 2010/0010799 A1 | 1/2010 | Altrichter |
| 2010/0042999 A1 | 2/2010 | Dorai et al. |
| 2010/0153631 A1 | 6/2010 | Moon et al. |
| 2010/0169602 A1 | 7/2010 | Hulbert et al. |
| 2010/0262633 A1 | 10/2010 | Bhattacharjee et al. |
| 2010/0287356 A1 | 11/2010 | Cameron et al. |
| 2010/0306591 A1 | 12/2010 | Krishna |
| 2010/0318718 A1 | 12/2010 | Eilert et al. |
| 2011/0066808 A1 | 3/2011 | Flynn et al. |
| 2011/0072006 A1 | 3/2011 | Yu et al. |
| 2011/0078340 A1 | 3/2011 | Kim et al. |
| 2011/0093654 A1 | 4/2011 | Roberts et al. |
| 2011/0131199 A1 | 6/2011 | Simon et al. |
| 2011/0271264 A1 | 11/2011 | Vorbach et al. |
| 2011/0313999 A1 | 12/2011 | Bruno et al. |
| 2012/0072744 A1 | 3/2012 | Jain et al. |
| 2012/0089595 A1 | 4/2012 | Jaecksch |
| 2012/0124318 A1 | 5/2012 | Bivens |
| 2012/0144092 A1 | 6/2012 | Hsieh |
| 2012/0151127 A1 | 6/2012 | Lim |
| 2012/0151252 A1 | 6/2012 | Harris et al. |
| 2012/0158799 A1 | 6/2012 | Morsi et al. |
| 2012/0246392 A1 | 9/2012 | Cheon |
| 2012/0290768 A1 | 11/2012 | Rubowitz et al. |
| 2013/0013860 A1 | 1/2013 | Franceschini |
| 2013/0074092 A1 | 3/2013 | Gounares et al. |
| 2013/0080621 A1 | 3/2013 | Jain et al. |
| 2013/0081005 A1 | 3/2013 | Gounares et al. |
| 2013/0086309 A1 | 4/2013 | Lee |
| 2013/0103380 A1 | 4/2013 | Brandstatter et al. |
| 2013/0226903 A1 | 8/2013 | Wu et al. |
| 2013/0246698 A1 * | 9/2013 | Estan .................... G11C 7/1072 |
| | | 711/108 |
| 2013/0275716 A1 | 10/2013 | Nishida |
| 2013/0283250 A1 | 10/2013 | Eichenberger |
| 2013/0326109 A1 | 12/2013 | Kivity |
| 2014/0007043 A1 | 1/2014 | Aliseychik et al. |
| 2014/0089564 A1 | 3/2014 | Liu et al. |
| 2014/0108723 A1 | 4/2014 | Nowoczynski |
| 2014/0188870 A1 | 7/2014 | Borthakur |
| 2014/0280685 A1 | 9/2014 | Magenheimer |
| 2014/0281212 A1 * | 9/2014 | Schreter ............... G06F 3/0674 |
| | | 711/112 |
| 2014/0281249 A1 | 9/2014 | Waldsperger |
| 2014/0282455 A1 | 9/2014 | Felch |
| 2014/0293801 A1 * | 10/2014 | Dimou ................. H04W 24/08 |
| | | 370/252 |
| 2015/0012465 A1 * | 1/2015 | Pingenot ............... G06N 5/025 |
| | | 706/12 |
| 2015/0062736 A1 | 3/2015 | Kim et al. |
| 2015/0077426 A1 | 3/2015 | Kweon et al. |
| 2015/0081300 A1 * | 3/2015 | Kim ....................... G10L 15/07 |
| | | 704/246 |
| 2015/0089604 A1 * | 3/2015 | Mathew ............... H04L 67/141 |
| | | 726/5 |
| 2015/0106582 A1 | 4/2015 | Mai et al. |
| 2015/0169226 A1 | 6/2015 | Shen et al. |
| 2015/0199126 A1 | 7/2015 | Jayasena |
| 2015/0206574 A1 | 7/2015 | Greathouse |
| 2015/0309789 A1 | 10/2015 | Thorat |
| 2015/0363319 A1 | 12/2015 | Qi |
| 2015/0370560 A1 * | 12/2015 | Tan .................... G06F 9/30058 |
| | | 717/148 |
| 2015/0378169 A1 | 12/2015 | Naeimi |
| 2016/0019132 A1 | 1/2016 | Vilakkunnadathil |
| 2016/0117258 A1 | 4/2016 | Karamcheti et al. |
| 2016/0125927 A1 | 5/2016 | Wei |
| 2016/0150003 A1 | 5/2016 | Magdon-Ismall |
| 2016/0179685 A1 | 6/2016 | Byun et al. |
| 2016/0188217 A1 | 6/2016 | Golander et al. |
| 2016/0196112 A1 | 7/2016 | Edwards et al. |
| 2016/0196324 A1 | 7/2016 | Haviv et al. |
| 2016/0005423 A1 | 8/2016 | Neppalli et al. |
| 2016/0253093 A1 | 9/2016 | Zhang |
| 2016/0321048 A1 | 11/2016 | Matsuura |
| 2016/0328169 A1 | 11/2016 | Hassan |
| 2016/0336069 A1 | 11/2016 | Lin |
| 2016/0378169 A1 | 12/2016 | Naeimi |
| 2016/0378829 A1 | 12/2016 | Vengerov et al. |
| 2016/0378977 A1 | 12/2016 | Alme et al. |
| 2017/0010817 A1 | 1/2017 | Lim |
| 2017/0052741 A1 | 2/2017 | Hassan |
| 2017/0052742 A1 | 2/2017 | Hassan |
| 2017/0060740 A1 | 3/2017 | Doerner |
| 2017/0090776 A1 | 3/2017 | Kowles |
| 2017/0091334 A1 | 3/2017 | Kabiljo et al. |
| 2017/0115892 A1 | 4/2017 | Gokita |
| 2017/0116210 A1 | 4/2017 | Park et al. |
| 2017/0147516 A1 * | 5/2017 | De ......................... G06F 3/061 |
| 2017/0154136 A1 | 6/2017 | Eckmann et al. |
| 2017/0160955 A1 | 6/2017 | Jayasena |
| 2017/0161198 A1 | 6/2017 | Trika |
| 2017/0193136 A1 | 7/2017 | Prasad et al. |
| 2017/0206010 A1 | 7/2017 | Nachimuthu |
| 2017/0206172 A1 | 7/2017 | Ma |
| 2017/0212843 A1 | 7/2017 | Agesen et al. |
| 2017/0220256 A1 | 8/2017 | Balasubramonian |
| 2017/0220257 A1 | 8/2017 | Balasubramonian |
| 2017/0220488 A1 | 8/2017 | Balasubramonian |
| 2017/0220516 A1 | 8/2017 | Eilert et al. |
| 2017/0223046 A1 | 8/2017 | Singh |
| 2017/0242595 A1 | 8/2017 | Niu |
| 2017/0289000 A1 | 10/2017 | Parks et al. |
| 2017/0301386 A1 | 10/2017 | Parks et al. |
| 2017/0352012 A1 | 12/2017 | Hearn et al. |
| 2018/0024750 A1 | 1/2018 | Hassan |
| 2018/0024754 A1 | 1/2018 | Hassan |
| 2018/0024755 A1 | 1/2018 | Hassan |

(56) References Cited

U.S. PATENT DOCUMENTS

| | | |
|---|---|---|
| 2018/0024821 A1 | 1/2018 | Hassan |
| 2018/0024913 A1 | 1/2018 | Hassan |
| 2018/0024922 A1 | 1/2018 | Hassan |
| 2018/0024923 A1 | 1/2018 | Hassan |
| 2018/0024928 A1 | 1/2018 | Hassan |
| 2018/0025016 A1 | 1/2018 | Hassan |
| 2018/0025055 A1 | 1/2018 | Hassan |
| 2018/0025904 A1 | 1/2018 | Hassan |
| 2019/0057131 A1 | 2/2019 | Hassan |

OTHER PUBLICATIONS

U.S. Appl. No. 14/831,567, Ahmad Hassan, filed Aug. 20, 2015.
U.S. Appl. No. 14/831,624, Ahmad Hassan, filed Aug. 20, 2015.
U.S. Appl. No. 15/677,700, Hassan, filed Aug. 15, 2017.
Dhiman et al., "PDRAM a hybrid PRAM and DRAM main memory system," Proceedings of the 46th Annual Design Automation Conference, Jul. 26-31, 2009, pp. 664-669.
Hassan et al., "Analytical models and techniques for Software-Managed Energy-Efficient Hybrid DRAM/NVM Main Memory," AMC International Conference on Computing Frontiers 2015, May 18-21, 2015.
Hassan et al., "Energy-Efficient In-Memory Data Stores on Hybrid Memory Hierarchies," Eleventh International Workshop on Dada Management on New Hardware, Jun. 2015, last retrieved from https //event.cwi.nl/damon2015/slides/slides-hassan.pdf on Jan. 5, 2018.
Hu et al., "Data allocation optimization for hybrid scratch pad memory with sram and nonvolatile memory," IEEE Transactions on Very Large Scale Integration (VLSI) Systems, Jun. 2013, 21(6) 1094-1102.
Li et al., "Assert(!Defined(Sequential I/O))," Proceedings of the 6th USENIX Conference on Hot Topics in Storage and File Systems, Jun. 17-18, 2014, 1-5.
Luk et al., "Pin Building Customized Program Analysis Tools with Dynamic Instrumentation," ACM Sigplan Notices, Jun. 2005, 40(6) 190-200.
Mogul et al., "Operating system support for NVM+DRAM hybrid main memory," Proceedings of teh 12th Conference on Hot Topics in Operating Systems, May 18-20, 2009, 1-5.
Ramos et al., "Page placement in hybrid memory systems," Proceedings of the International Conference on Supercomputing, May 31-Jun. 4, 2011.
U.S. Office Action in related U.S. Appl. No. 15/213,621 dated Dec. 13, 2018, 12 pages.
U.S. Office Action in related U.S. Appl. No. 15/213,621 dated May 17, 2018, 11 pages.
U.S. Office Action in related U.S. Appl. No. 15/213,654 dated Dec. 1, 2017, 21 pages.
U.S. Office Action in related U.S. Appl. No. 15/213,654 dated Jul. 2, 2018, 41 pages.
U.S. Office Action in related U.S. Appl. No. 15/213,654 dated Mar. 16, 2018, 31 pages.
U.S. Office Action in related U.S. Appl. No. 15/213,654 dated Nov. 27, 2018, 7 pages.
U.S. Office Action in related U.S. Appl. No. 15/213,754 dated Feb. 27, 2018, 23 pages.
U.S. Office Action in related U.S. Appl. No. 15/213,754 dated Jun. 20, 2018, 22 pages.
U.S. Office Action in related U.S. Appl. No. 15/213,754 dated Sep. 11, 2018, 22 pages.
U.S. Office Action in related U.S. Appl. No. 15/213,816 dated Jul. 26, 2018, 27 pages.
U.S. Office Action in related U.S. Appl. No. 15/213,930 dated Jun. 19, 2018, 20 pages.
U.S. Office Action in related U.S. Appl. No. 15/213,930 dated Mar. 9, 2018, 20 pages.
U.S. Office Action in related U.S. Appl. No. 15/213,930 dated Oct. 20, 2018, 23 pages.
U.S. Office Action in related U.S. Appl. No. 15/213,960 dated Dec. 13, 2018, 22 pages.
U.S. Office Action in related U.S. Appl. No. 15/213,960 dated Jan. 11, 2018, 22 pages.
U.S. Office Action in related U.S. Appl. No. 15/213,960 dated Jul. 12, 2018, 24 pages.
U.S. Office Action in related U.S. Appl. No. 15/214,019 dated Aug. 27, 2018, 8 pages.
U.S. Office Action in related U.S. Appl. No. 15/214,019 dated Dec. 22, 2017, 12 pages.
U.S. Office Action in related U.S. Appl. No. 15/214,019 dated Jun. 14, 2018, 10 pages.
U.S. Office Action in related U.S. Appl. No. 15/214,082 dated Aug. 27, 2018, 27 pages.
Wang et al., "Optimizated Allocation of Data Variables to PCM/DRAM-based Hybrid Main Memory for Real-Time Embedded Systems," Embedded Systems Letters, IEEE, Sep. 2014, 6(3) 61-64.
U.S. Office Action in related U.S. Appl. No. 15/213,754 dated Jan. 29, 2019, 29 pages.
U.S. Office Action in related U.S. Appl. No. 15/213,816 dated Feb. 7, 2019, 27 pages.
U.S. Office Action in related U.S. Appl. No. 15/213,626 dated Apr. 12, 2019, 23 pages.
U.S. Office Action in related U.S. Appl. No. 15/213,674 dated Apr. 12, 2019, 27 pages.
U.S. Office Action in related U.S. Appl. No. 15/213,930 dated Feb. 26, 2019, 35 pages.
U.S. Office Action in related U.S. Appl. No. 15/214,082 dated Mar. 8, 2019, 41 pages.
Chen et al., "FSRAM: Flexible Sequential and Random Access Memory for Embedded Systems" Laboratory for Advanced Research in Computing Technology and Compilers Technical Report No. ARCTiC, Mar. 1, 2004, 6 pages.
Dulloor et al,, "Data tiering in heterogeneous memory systems" Proceedings of the Eleventh European Conference on Computer Systems, ACM, Apr. 18, 2016, 16 pages.
Ouyang et al., "SSD-Assisted Hybrid Memory to Accelerate Menncached over High Performance Networks" 2012 41st International Conference on Parallel Processing, IEEE, Sep. 10, 2012, 10 pages.
Wang et al., ""NVMalloc: Exposing an Aggregate SSD Store as a Memory Partition in Extreme-Scale Machines"" 2012 IEEE 26thInternational Parallel and Distributed Processing Symposium, May 21, 2012, 12 pages.
Zakai, "Emscripten: An LLVM-to-JavaScript Compiler," Proceedings of the ACM international conference companion on Object oriented programming systems languages and applications companion (OOPSLA), Portland, Oregon, Oct. 22-27, 2011, 12 pages.
U.S. Office Action in related U.S. Appl. No. 15/213,754 dated May 23, 2019, 32 pages.

\* cited by examiner

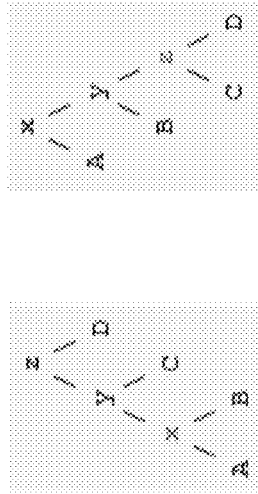
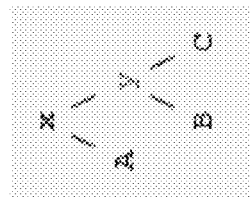
FIG. 4A
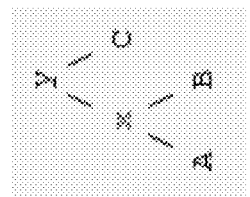
FIG. 4B
FIG. 5A
FIG. 5B
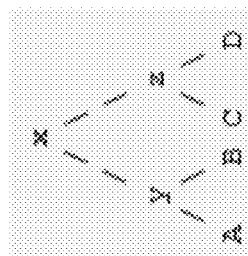
FIG. 6A
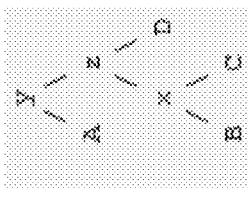
FIG. 6B

FULL SYSTEM SIMULATOR AND MEMORY-AWARE SPLAY TREE FOR IN-MEMORY DATABASES IN HYBRID MEMORY SYSTEMS

BACKGROUND

A business or other type of enterprise may operate enterprise systems to provide software functionality to customers and employees. An enterprise system may include back-end enterprise servers that host enterprise applications such as enterprise resource planning (ERP) systems, client-relationship management (CRM) systems, product lifecycle management (PLM) systems, supply chain management (SCM) systems, supplier relationship management (SRM) systems, and so forth. During the execution of an enterprise application, application data may be placed in or accessed from the main memory of the enterprise server, such that the application data is immediately accessible by processors of the enterprise server.

Increasingly, large amounts of application data are stored in the main memory of enterprise servers. Main memory may include dynamic random access memory (DRAM), which consumes a relatively high amount of static energy both in active and idle states due to continuous leakage and refresh power. Various byte-addressable non-volatile memory (NVM) technologies promise near-zero static energy and persistence. However, NVM may exhibit high latency and high dynamic energy relative to DRAM.

SUMMARY

Implementations of the present disclosure include computer-implemented methods for a memory-aware SPLAY tree for use in hybrid memory systems. In some implementations, methods include actions of receiving a key, the key corresponding to an object that is stored in a hybrid memory system, searching a SPLAY tree based on the key to identify a node of the SPLAY tree, determining a type of memory that the object is stored on in the hybrid memory system, the type of memory including one of a first type of memory and a second type of memory, selectively adjusting an endurance counter associated with the object based on a location of the node within the SPLAY tree, and the type of memory that the object is stored on in the hybrid memory system, and selectively migrating the object between the first memory type and the second memory type based on the EC associated with the object.

These and other implementations may each optionally include one or more of the following features: selectively migrating the object includes: determining that the node is a leaf node, that the object is stored in the first memory type based on a node value of the node, and that a difference between a global counter (GC) of the SPLAY tree and the EC of the object exceeds an endurance threshold (ET), and in response: migrating the object from the first type of memory to the second type of memory in the hybrid memory system; the object is not migrated from the first type of memory to the second type of memory in the hybrid memory system, in response to determining one or more of that the node is a non-leaf node, that the object is stored in the second memory type based on a node value of the node, and that a difference between the GC of the SPLAY tree and the EC of the object does not exceed the ET; the EC of the object and a GC of the SPLAY tree are incremented each time the SPLAY tree is searched for the key corresponding to the object; selectively adjusting the EC associated with the object includes: determining that the node is a leaf node, and that the object is stored on the second memory type, and in response, resetting a value of the EC; the key includes an object identifier assigned to the object, the object identifier uniquely identifying the object among a plurality of objects; and the first memory type includes dynamic random access memory (DRAM), and the second memory type includes non-volatile memory (NVM).

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 4A and 4B depict clock-wise rotation of a SPLAY tree.

FIGS. 5A and 5B depict double zig-zag rotation of a SPLAY tree.

FIGS. 6A and 6B depict simple clock-wise rotation of a SPLAY tree.

Like reference symbols in the various drawings indicate like elements.

DETAILED DESCRIPTION

Figure 1:
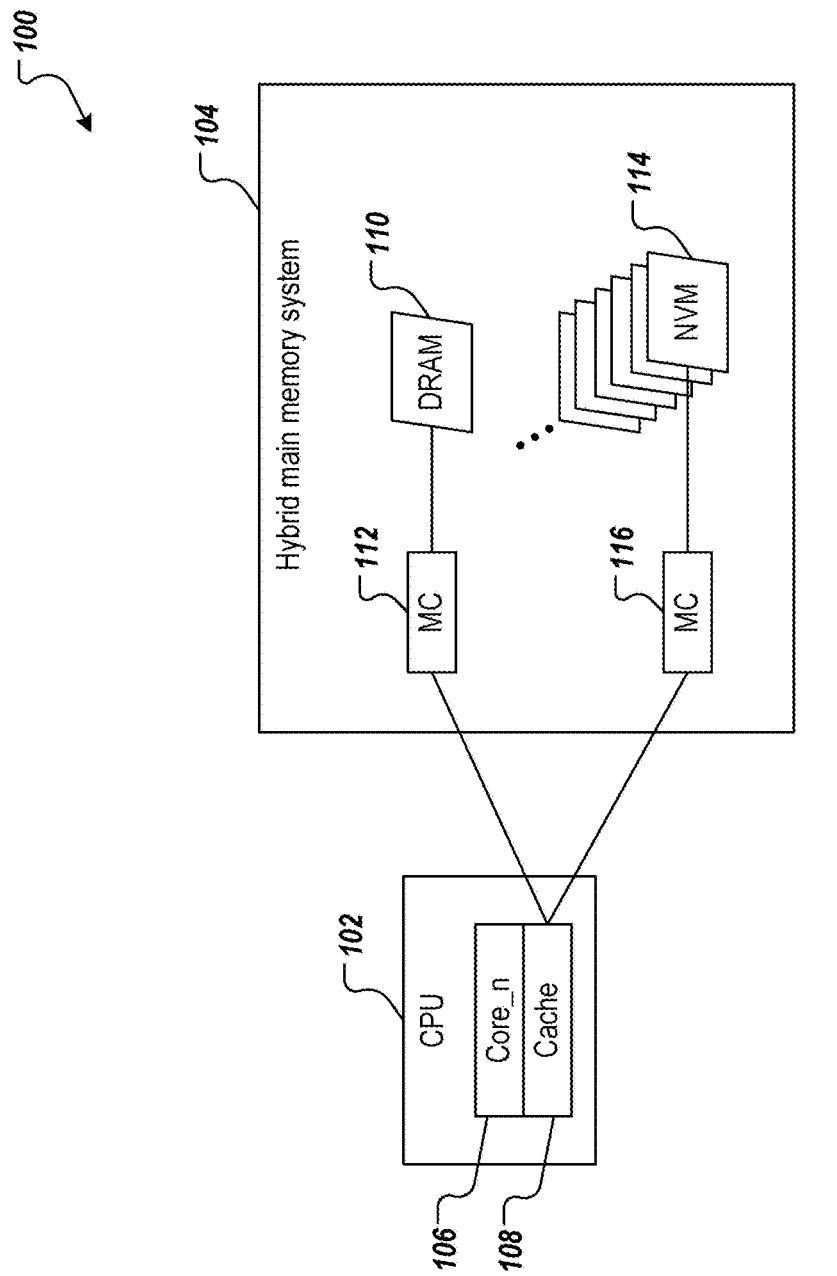
FIG. 1 depicts an example memory architecture in accordance with implementations such as those of the present disclosure.

Implementations of the present disclosure are further directed to a memory-aware SPLAY tree for in-memory databases in hybrid memory systems. In some implementations, actions can include receiving a key, the key corresponding to an object that is stored in a hybrid memory system, searching a SPLAY tree based on the key to identify a node of the SPLAY tree, determining a type of memory that the object is stored on in the hybrid memory system, the type of memory including one of a first type of memory and a second type of memory, selectively adjusting an endurance counter associated with the object based on a location of the node within the SPLAY tree, and the type of memory that the object is stored on in the hybrid memory system, and selectively migrating the object between the first memory type and the second memory type based on the EC associated with the object.

To provide context for implementations of the present disclosure, real-time data analytics aim at making knowledge available with sub-second and often sub-millisecond response time. For example, real-time enterprise resource planning (ERP) systems enable enterprises to view every change in the enterprise as soon as it happens, and can be a driver in the success of the enterprise. In some examples, real-time access to information helps in gaining competitive advantage through efficient and improved (e.g., more informed) decision making, product pricing, risk management, product life-cycle, customer feedback, customer engagement, brand development, product pricing, and reduced total cost of ownership (TCO). The growing volumes of enterprise data makes it challenging to achieve the target response times in real-time data analytics.

The advances in multi-core processing, caching and less expensive main memory has brought a major breakthrough in designing real-time enterprise systems. In-memory databases open doors for real-time analytics as it uses faster main-memory as a primary storage and bypass I/O disk delays in analytical data processing. Improvements in both hardware and in-memory databases have triggered the unification of both operational and analytical storage models together in a unified in-memory data store. For example, slower, disk-based memory is only required for persistent storage. This has a negligible impact on the throughput of in-memory databases, because persistence is moved from the critical path. Accordingly, in-memory databases enable real-time data analytics on unified data with minimal response times, because the data resides in main memory, which is an order of magnitude faster for accessing than traditional, disk-based memory.

With regard to types of memory used for in-memory systems, non-volatile memory (NVM) that provides persistence (like a traditional hard disk), and byte-addressability (like conventional DRAM) is termed as storage class memory (SCM). Examples SCMs include phase change memory (PCM), spin transfer torque memory (STT-RAM), and memristors. DRAM uses capacitance to store electric charge, which requires continuous power due to leakage. NVM uses resistance, rather than capacitance, for bit representation. Both DRAM and NVM consume static energy and dynamic energy. Static energy is consumed at all times when the memory system is switched on, and is independent of any memory accesses. Dynamic energy is an energy that is consumed by an actual read or a write operation (memory accesses). Static energy is further divided into cell leakage energy, and refresh energy. NVM is superior to DRAM with respect to static energy consumption, because NVM has low leakage energy, and does not require refresh energy. With non-negligible leakage power and relatively high refresh power, DRAM can consume 30-40% of the total server power. The DRAM size directly influences the power consumption of the servers.

NVM is more scalable than DRAM. For example, it has been shown that PCM can scale down to 10 nm, while the ability of DRAM to scale below 22 nm feature sizes is yet to be confirmed. Through NVM, such highly scalable and denser main memory storage enables building of enterprise systems with larger main memory storage capacity. However, the read or write access latency and dynamic energy of NVM are higher than DRAM. For example, the read latency and the write latency of PCM is approximately 4.4× and 12× times that of DRAM, respectively. As another example, the read dynamic energy and the write dynamic energy of PCM is approximately 2× and 43× times that of DRAM, respectively. Further, the storage cells of NVM wear with the usage.

Accordingly, the discrepancies in access latency and dynamic energy, as well as wear of NVM, pose challenges in using NVM as an alternative to DRAM. However, the scaling properties and low static energy of NVM are motivating factors in the design of energy efficient hybrid main memory systems that include both NVM and DRAM. In general, designing an energy efficient hybrid memory system typically focuses on designing a hybrid memory system that is more energy efficient than a DRAM-only memory system. Here, energy efficiency is achieved through the low static energy of NVM in comparison to DRAM. One strategy is to replace as much DRAM as possible with SCM for reducing the energy consumption of the system, with a constraint of keeping the performance degradation (which results from NVM) to a defined minimum. In order to benefit from NVM in a hybrid memory system, an application-specific, hybrid memory system should be designed with appropriate sizes of NVM and DRAM.

Implementations are applicable to hybrid main memory systems, including DRAM and NVM, to support the operations of one or more applications executing in an enterprise environments, or any other appropriate computing environment. For example, application(s) may employ an in-memory database to enable access to the database with lower latency than may be exhibited when accessing a database stored in a disk storage device. Implementations of the present disclosure may analyze one or more data processing functions, which may be included in a query execution plan (QEP) of an application. A data processing function, which may also be referred to as a function or an operator, may include any number of data access operations such as read operations and write operations.

FIG. 1 depicts an example memory architecture 100 that may be implemented within an enterprise server or other type of computing device(s). In the example of FIG. 1, the example memory architecture 100 includes a central processing unit (CPU) 102 and a hybrid main memory system 104. The CPU 102 includes a core 106 having a respective cache 108. Although a single core 106 and respective cache 108 is depicted, it is appreciated that the CPU 102 may include multiple cores 106, each with a respective cache 108. Further, although a single CPU 102 is depicted, it is appreciated that computing device(s) may include multiple CPUs 102. The main memory system 104 includes DRAM 110 with a respective memory controller (MC) 112, and NVM 114 with a respective MC 116. In some cases, a cache 108 accesses (e.g., reads, writes, deletes, etc.) data in the DRAM 110 through the MC 112, and accesses data in the NVM 114 through the MC 116. The hybrid main memory system 104 may include any number of instances, or cells, of DRAM and NVM, to provide any amount of memory for use by the CPU(s) 102.

In some examples, the example memory architecture 100 may support an in-memory database that uses main memory for data storage. Main memory may include one or more types of memory (e.g., DRAM, NVM) that communicates with one or more processors, e.g., CPU(s), over a memory bus. An in-memory database system may be contrasted with database management systems that employ a disk storage mechanism. In some examples, in-memory database systems may be faster than disk storage databases, because internal optimization algorithms may be simpler and execute fewer CPU instructions. In some examples, accessing data in an in-memory database system may reduce or eliminate seek time when querying the data, providing faster and more predictable performance than disk-storage databases. An in-memory database may include a row-oriented database, in which data is stored in any number of rows or records. An in-memory database may also include a column-oriented in-memory database, in which data tables are stored as sections of columns of data (rather than as rows of data). An example in-memory database system is HANA™, provided by SAP™ SE of Walldorf, Germany.

In some examples, simulators are used to model performance of different types of memory. An example state-of-the-art, full system simulator is the GEMS simulator, which includes a configurable simulation framework, multiple ISAs, and diverse CPU models. GEMS can be described as a cycle accurate simulator for simulating X86 hardware (e.g., virtual X86 hardware). GEMS takes the static executable code of an application, and runs the executable code, as if the executable code were running on the real X86 hardware. However, in a non-modified executable of an in-memory database, the core functionality of the in-memory database is largely provided through shared libraries, which are loaded when the application begins executing on the real hardware. In this manner, the executable code of the in-memory database can be kept relatively small.

On the real, non-virtual system, the loading of shared libraries and accessing functions from the shared libraries is relatively fast (e.g., in milliseconds). In one example, in Linux, shared libraries are created with *.so extension. Shared libraries are loaded when the application starts executing on the hardware.

However, when the application is to be executed on simulated hardware, it is not feasible to load functions from the shared libraries on every single access to the particular function from the application code. More particularly, when the executable calls a function of a shared library, the function name is resolved to a function address by the shared library. Such translation from function names to functions address is relatively slow when executable is running on the simulated hardware. Moreover, the presence of particular types of NVM (e.g., memristors) further slows the simulator, because of higher latencies for read and write operations as compared to other types of memory (e.g., DRAM). Consequently, it is nearly impossible to run those in-memory database executables on system simulators, where there is a heavy reliance on shared libraries. Large, enterprise-level software, such as in-memory databases, heavily rely on shared libraries in order to load database operators on the runtime through external libraries. In order to run an in-memory database application using a simulator, a methodology need be designed for faster simulation. In this manner, complex analytical queries on large data sets can be simulated and tested at a faster, pragmatic speed. In this manner, improvement and optimization of database algorithms for emerging memories is more practically achievable.

In view of the above context, and as described in further detail herein, implementations of the present disclosure provide for simulation of in-memory database applications, which includes binding the function names to the function addresses by static linking and reading an executable and linking format (ELF) binary of an application, and storing the ELF data into a SPLAY tree at the start of the application. In some implementations, whenever the application requires a function name to be bound to a function virtual address in memory, the SPLAY tree is searched instead of looking for the function in the shared library. In this manner, significant reductions in simulation time of in-memory database systems can be reduced. In some examples, a reduction of up to approximately 68% in simulation time is achieved relative to traditional simulation scenarios.

In further detail, implementations of the present disclosure leverage the fact that, when the application source code is statically compiled to provide executable code (e.g., binary code), the function names and addresses are embedded into the executable code by the compiler, and an ELF binary (e.g., computer-readable file) is provided. In some implementations, the ELF binary is read to determine all of the function names that are required by the database for running a particular set of queries. In some examples, only those function names that are required for the particular queries in the set of queries are retrieved from the ELF binary. In some examples, retrieving a complete set of all functions that could be called would result in an unnecessary slowdown of the simulation. In some implementations, a list of function addresses is provided, and includes respective function addresses of the functions required to execute the queries in the set of queries. In some implementations, a SPLAY tree is provided, and includes nodes having node names corresponding to respective function names that are to be searched, and having node values corresponding to the function address of the respective function, which will be assigned to that function when the applications starts executing.

An example portion of an ELF binary is depicted below in Listing 1. The example of Listing 1 is provided based on an example benchmark query, namely query #11 of the queries provided in the TPC Benchmark H (TPC-H). The TPC-H is a decision support benchmark that includes a set of business oriented ad-hoc queries (e.g., a set of benchmark queries), and concurrent data modifications. The TPC-H is described as being representative of decision support systems that examine large volumes of data, execute queries with a high degree of complexity, and provide answers to critical business questions.

Listing 1: Example Portion of ELG Binary

| Address | Type | Name |
|---|---|---|
| 00000000005b8130 | FUNC | BATmultiprintf |
| 00000000009b2c20 | FUNC | xmlDocDumpMemoryEnc |
| 0000000000997060 | FUNC | xmlUCSIsTaiXuanJingSymbol |
| 0000000000a21370 | FUNC | _nc_update_screensize |
| 0000000000578a10 | FUNC | ATOMunknown_name |
| 000000000077af90 | FUNC | setEndPoint |
| 0000000000a5c350 | FUNC | _IO_fread |
| 0000000000 6cbe80 | FUNC | SYSsetmem_maxsize |
| 000000000057d0c0 | FUNC | BATfree |
| 000000000081ee10 | FUNC | mvc c r e a t e idx |
| 0000000000f31078 | OBJECT | progname |
| 00000000005b6400 | FUNC | GDKmove |
| . . . | | |

In the example of Listing 1, the first column is the virtual address of the function, the second column describes the entry type (e.g., FUNC for function type, OBJECT for data object), and the third column provides the name that is provided in the application code.

Implementations of the present disclosure provide multiple approaches to speed up the function address look-up. In some implementations, a dictionary is provided in the application source code, the dictionary identifying the functions that are required by a particular query set. For example, the dictionary can identify a first set of functions including functions that are required to execute a first query set, and can identify a second set of functions including functions that are required to execute a second query set. In some examples, the key of the dictionary is a function name string, and the value of each item is the function name. In some examples, a benefit of such a dictionary is that the function address value in the dictionary will be resolved to real function address by the compiler during static linking. Listing 2 below provides an example dictionary that can be provided in application source code:

Listing 2: Example Dictionary

```
//Declare function names as variables so compiler can resolve
    them to addresses
extern void * AGGRavg2_dbl;
extern void * AGGRavg3_dbl;
extern void * AGGRcount2;
extern void * AGGRcount2nils;
extern void * AGGRcount2nils;
extern void * AGGRcount2nonils;
extern void * AGGRcount3;
extern void * AGGRcount3nils;
extern void * AGGRcount3nonils;
extern void * AGGRmax2;
extern void * AGGRmax3;
extern void * AGGRmedian;
extern void * AGGRmedian3;
extern void * AGGRmin2;
extern void * AGGRmin3;
//Dictionary. The following dictionary values will be resovled
    to virtual address by the compiler at compile time
struct sym elf_symbols1 [15] = {
{"AGGRavg2_dbl" , &AGGRavg2_dbl},
{"AGGRavg3_dbl" , &AGGRavg3_dbl},
{"AGGRcount2" , &AGGRcount2},
{"AGGRcount2nils" , &AGGRcount2nils},
{"AGGRcount2nils" , &AGGRcount2nils},
{"AGGRcount2nonils" , &AGGRcount2nonils},
{"AGGRcount3" , &AGGRcount3},
{"AGGRcount3nils" , &AGGRcount3nils},
{"AGGRcount3nonils" , &AGGRcount3nonils},
{"AGGRmax2" , &AGGRmax2},
{"AGGRmax3" , &AGGRmax3},
{"AGGRmedian" , &AGGRmedian},
{"AGGRmedian3" , &AGGRmedian3},
{"AGGRmin2" , &AGGRmin2},
{"AGGRmin3" , &AGGRmin3}
}
```

In some implementations, the first time that the application (executable) makes a function call and requires the function address, the address look-up is performed, and the function addresses are stored in the SPLAY tree. In this manner, the address look-up need not be performed again for subsequent function calls, and subsequent accesses to the same function are served from the SPLAY tree. In this manner, look-up speeds of at O(log n) or O(1) can be achieved for consecutive accesses. In some implementations, if a function address is not present in the dictionary, or not resolved by the compiler during the compilation phase, the ELF binary is read (e.g., using Linux utilities). Listing 3 below provides example code for reading the ELF binary:

Listing 3: Example C Pseudo-Code for Reading ELF Binary

```
//Pseudocode for reading ELF in C language
fd = open ("/data/name/database-exe" , O_RDONLY)
elf_version (EV_CURRENT);
Elf_elf = elf_begin (fd , ELF_C_READ, NULL)
Elf_Data * data = elf_getdata(scn , data )) == 0 || data->
    d_size == 0)
Elf64_Sym *esym = (Elf64_Sym*) data->d_buf;
Elf64_Sym *lastsym = (Elf64_Sym*) ((char*) data->d_buf + data
    ->d_size);
/* Look through all functions in the ELF binary */
for (; esym < lastsym; esym++) {
    if (( esym->st_value == 0) ||
        (ELF64_ST_BIND(esym->st_info)== STB_WEAK) ||
        (ELF64_ST_BIND(esym->st_info)== STB_NUM) ||
        (ELF64_ST_TYPE(esym->st_info)!= STT_FUNC) )
            continue;
        func_name = elf_strptr(elf , shdr->sh_link , (size_t)
    esym->st_name);
        func_address = esym->st_value;
        }
}
```

Figure 2:
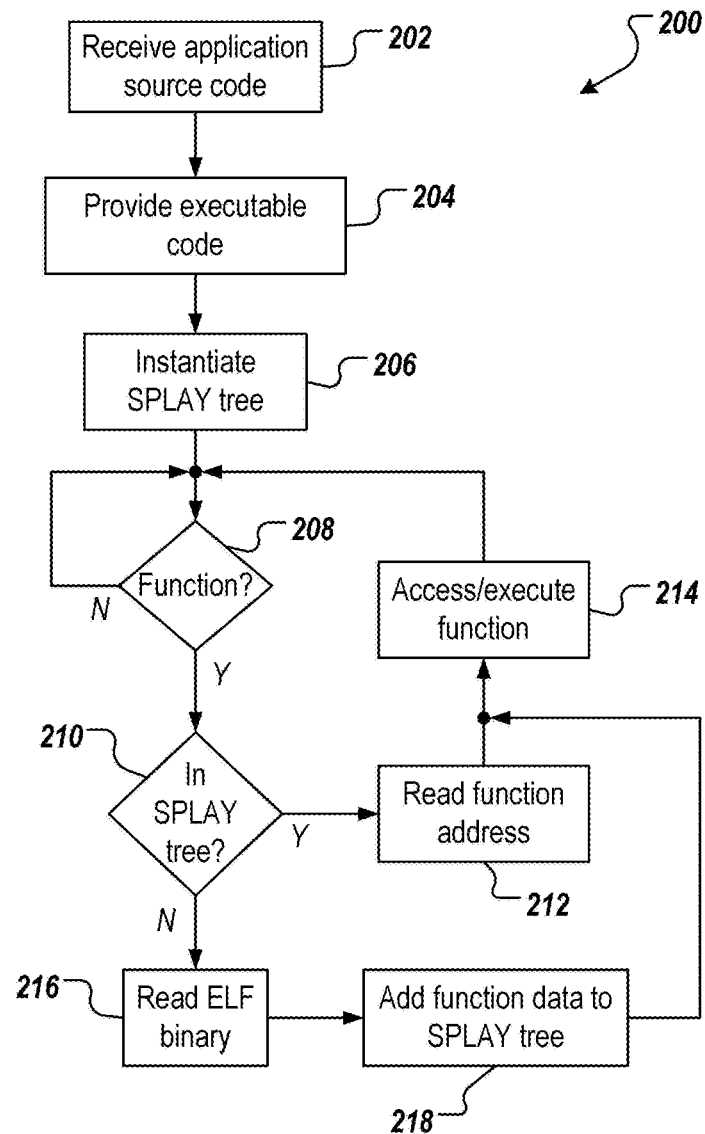
FIG. 2 depicts an example process that can be executed in accordance with implementations such as those of the present disclosure.

FIG. 2 depicts an example process 200 that can be executed in accordance with implementations of the present disclosure. In some implementations, the example process 200 may be performed using one or more computer-executable programs executed using one or more computing devices. In some examples, the example process 200 is performed to execute an in-memory database application on simulated hardware using a computer-executable simulator.

Application source code of an application is received (202). In some examples, the application provides at least a portion of an in-memory database, and the source code encodes a plurality of function calls to respective functions provided in one or more shared libraries. Executable code is provided (204). In some examples, the executable code is provided by compiling the application source code using a compiler, which results in the provision of an ELF binary. In some examples, for each function, a function name and a function address are embedded in the executable code (e.g., through static linking during compiling). In some examples, the function name and function address for a respective function are provided in the ELF binary. In some implementations, the ELF binary is provided based on a dictionary that is included in the application source code. In some examples, the dictionary only includes those functions that can be called for a set of queries that is to be processed by the application executing on the simulated hardware. That is, for example, the dictionary does not include all queries that could be processed by the application. A SPLAY tree is instantiated (206). For example, the SPLAY tree is provided in computer-readable memory and is initially empty of nodes.

It is determined whether a function is called during execution of the application on the simulated hardware (208). If a function is not called, the example process 200 loops back. If a function is called, it is determined whether function data for the function is stored in the SPLAY tree (210). In some examples, the function name is used to search the SPLAY tree to determine whether a node storing function data for the function is present in the SPLAY tree. If function data for the function is present in the SPLAY tree, the function address of the function is read from the SPLAY tree (212), and the function is accessed from a shared library and is executed (214), and the example process 200 loops back.

If function data for the function is not present in the SPLAY tree, the function address of the function is read from the ELF binary (216). Add function data to the SPLAY tree (218). In some examples, a node is added to the SPLAY tree, where a name of the node is assigned as the function name, and a value of the node is assigned as the function address. The function is accessed from a shared library and is executed (214), and the example process 200 loops back. At least a portion of the example process 200 is repeated for subsequent functions called during execution of the application on the simulated hardware.

Implementations of the present disclosure further provide a memory-aware SPLAY tree for in-memory databases running on hybrid memory systems. More particularly, implementations of the present disclosure provide a data structure for a memory-aware SPLAY tree, a process for node migration of the SPLAY tree on hybrid memory systems, and an evaluation of a SPLAY tree in accordance with implementations of the present disclosure on system simulator.

To provide context for implementations of the present disclosure, a data structure can be described as an organization of data in memory. In some examples, a data structure is designed to store data in such a way that the data can be efficiently accessed. Efficient data structures support application speed and optimization of performance. Different applications can have different data structures that implement the respective application's internal functionality. For in-memory databases, for example, a tree data structure is used for indexing data and enabling quick access to the data. Moreover, data insertion and deletion of table values can be performed with high locality and efficiency through use of a tree data structure. Although there are numerous types of tree data structures that could be used for databases, SPLAY tree and the $B^+$-tree are the most common tree data structures used in databases.

In some examples, a $B^+$-tree is a tree data structure that is used for indexing data in memory and storage. In some examples, a $B^+$-tree keeps the data in a sorted order, such that the insertions and deletions can be performed in logarithmic complexity. The $B^+$-tree was designed for indexing data on disk-based memory (hard disk drives). More recently, the $B^+$-tree is used for in-memory databases. A $B^+$-tree is referred to as being balanced, when all of the leaf nodes are at the same depth. In some examples, a $B^+$-tree is always a balanced tree where the depth increases slowly as keys are added to the tree. Example properties of a $B^+$-tree include: always remains balanced after insertion or deletion; every non-root node must be at least half full; the order is defined as the minimum number of keys in a non-leaf node; and the fan-out of a node is the number of pointers out from a particular node.

Figure 3:
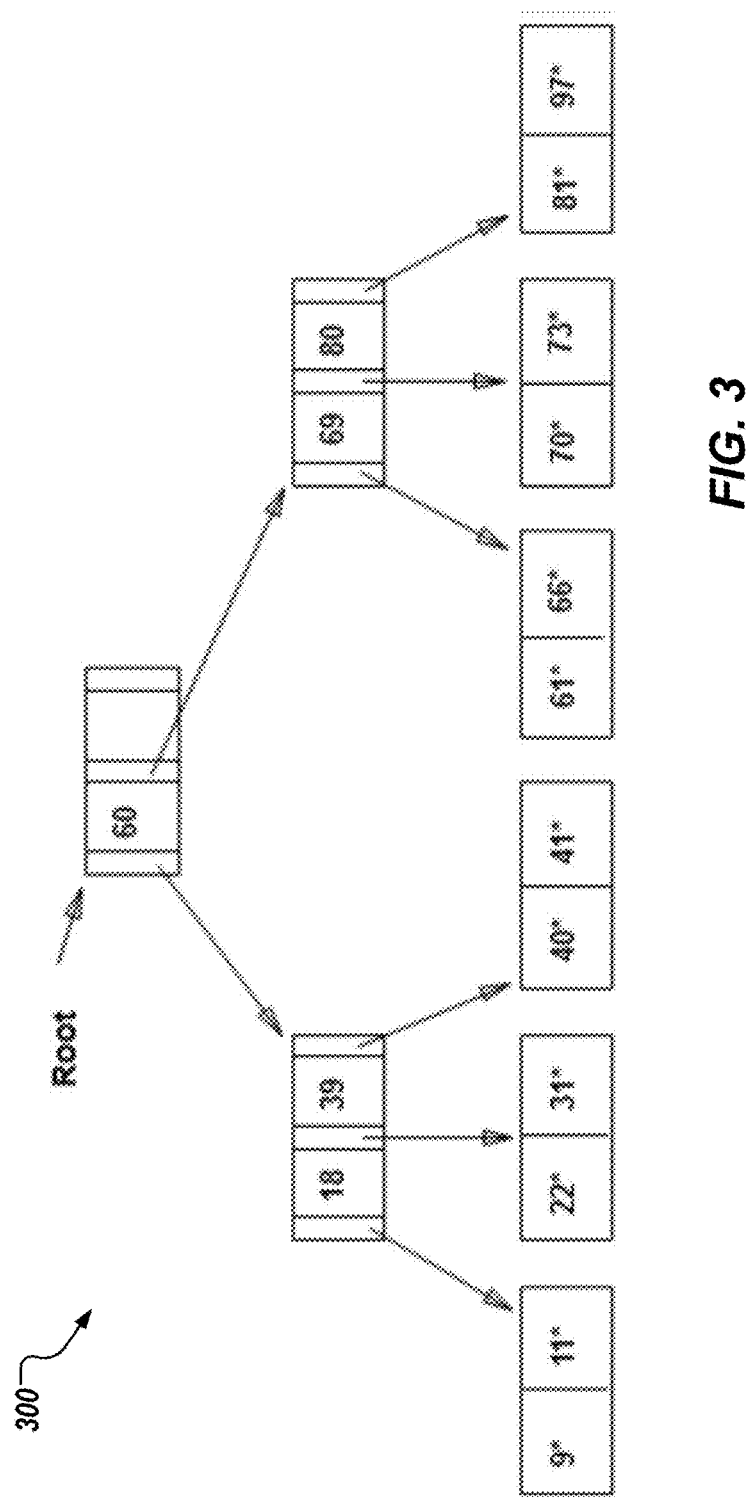
FIG. 3 depicts an example B$^+$-tree that is balanced.

In some examples, with a $B^+$-tree, searching happens with $log_o(n)$ speed, where o is the order, and n is the number of keys. In some examples, an insertion in a $B^+$-tree is done by: find a leaf node for inserting a new key; and if the leaf node is already full, splitting the leaf node and adjusting the parent indexing nodes, and splitting the parent index, if required to keep the tree balanced. In some examples, the complexity cost of insertion is the same as that of searching). In some examples, a deletion from a $B^+$-tree is done by: finding a leaf node for deleting the key; removing the key; and, if leaf node does not remain half full, splitting the parent indexing node accordingly to keep the $B^+$-tree balanced. FIG. 3 depicts an example $B^+$-tree 300 that is balanced.

A SPLAY tree can be described as a highly efficient form of a binary search $B^+$-tree that exploits the locality of incoming index look-up requests. The SPLAY tree is discussed in further detail herein in the context of in-memory databases, followed by a description of implementations of the present disclosure providing a memory-aware SPLAY tree.

In some examples, a SPLAY tree data structure is not always balanced. In some examples, the SPLAY tree data structure ensures that frequently accessed data is provided near the root of the SPLAY tree. In this manner, frequently accessed data can be accessed faster as it moved to near the root (top) of the tree, requiring relatively minimal traversals to search the data. The performance of a SPLAY tree is O(log n), meaning that a sequence of X operations on a node n can occur in O(X log n) time. Accordingly, for in-memory databases, the SPLAY tree is very beneficial, because (in the database world) at least a portion of the data is accessed frequently (so-called hot data). Example hot data can include customer look-up tables and product tables in a business context. In some examples, a SPLAY tree provides relatively faster access times for such use cases.

In order to bring the data closer to the top (root), so-called rotation of the SPLAY tree can be performed, when a particular key is accessed. There are multiple types of rotations for SPLAY tree, some of which are discussed in further detail below with reference to FIGS. 4A-6B.

With particular reference to FIGS. 4A and 4B, one type of rotation is provided as clock-wise rotation (Rotation 1). In clock-wise rotation, the SPLAY tree is rotated in a clock-wise direction, such that the key that is being accessed becomes the new root. In the depicted example, the node x is to be accessed (FIG. 4A). In response, clock-wise rotation occurs, such that the node x moves up to become the root node, and the former root node y is moved down to become an intermediate node (FIG. 4B). With particular reference to FIGS. 5A and 5B, another type of rotation is provided as double zig-zag rotation (Rotation 2). In double zig-zag rotation, the original SPLAY tree is relatively long (FIG. 5A). The x node is accessed at the bottom of the SPLAY tree, and in response, a double rotation is performed to move the node x to become the root node (FIG. 5B). With particular reference to FIGS. 6A and 6B, another type of rotation is provided as simple zig-zag rotation (Rotation 3). In simple zig-zag rotation, a new sub-tree is provided (compare FIG. 6A to FIG. 6B). In the example rotations described herein, in response to the node x being accessed, the node x becomes the root node, and the rest of the SPLAY tree is rotated. In this manner, cold data (less frequently accessed data) is moved toward the leaf nodes, and hot data (more frequently accessed data) is moved toward the top (root) of the SPLAY tree.

In view of the foregoing context, implementations of the present disclosure provide modifications to a SPLAY tree and handling thereof to provide an awareness to the data structure of emerging NVM technologies. More particularly, implementations of the present disclosure provide a memory-aware SPLAY tree that is optimized for hybrid memory systems. Evaluations of the memory-aware SPLAY tree of the present disclosure have revealed up to approximately 60% energy savings in execution of in-memory databases on hybrid memory systems using the memory-aware SPLAY tree as compared to a naïve (non-memory-aware) SPLAY tree.

In further detail, and in accordance with implementations of the present disclosure, a memory-aware SPLAY tree that indexes objects (data objects) stored in a hybrid memory system during execution of an in-memory database. In some implementations, a node of the SPLAY tree is associated with a respective object stored in the hybrid memory system.

Each node includes a node name and a node value. In some examples, the node name is an object identifier that uniquely identifies the object that the node represents. In some examples, the node value is the physical memory address (e.g., in NVM, or DRAM) where the object is stored in the hybrid memory system.

In some implementations, the SPLAY tree includes so-called hot nodes (e.g., nodes corresponding to objects that relatively frequently accessed, and thus, stored in DRAM (relatively lower latency memory)), so-called cold nodes (e.g., nodes corresponding to objects that are relatively less-frequently accessed, and thus, stored in NVM (relatively lower energy memory)). In some implementations, objects are migrated between DRAM/NVM. For example, migration of cold objects on NVM provides a significant energy savings. This is a result of only the handful of data that is hot at a given time in database workloads being stored in higher energy-consuming DRAM, while majority of data remaining cold (e.g., tables that are never accessed in a particular query) being stored in NVM.

In accordance with implementations of the present disclosure, objects corresponding to nodes of the SPLAY tree that become the leaf node are to be stored in NVM, and objects corresponding to non-leaf nodes are to be stored in DRAM. However, rotation of the SPLAY tree (examples described above), can be aggressive. For example, in traditional rotation techniques, as soon as an object associated with a node is accessed, rotation is executed. This would result in numerous write accesses to NVM, which would increase latency, and decrease the lifespan of NVM (e.g., due to limited write endurance of NVM).

In view of this, implementations of the present disclosure provide an adaptive model, which provides that an object associated with a leaf node is only moved to NVM, after particular criteria are met. Accordingly, the model underlying the memory-aware SPLAY tree of the present disclosure can be described as an endurance-time aware SPLAY tree model for hybrid memory systems. In some examples, when a leaf node is touched, and becomes the new root node, the object corresponding to the node is not migrated from NVM to DRAM until the criteria is met. Algorithm 1, below, provides an example description of the endurance-time aware SPLAY tree model of the present disclosure:

---

Algorithm 1: Memory-aware SPLAY Tree for Hybrid Memory Systems

Let Endurance_Counter (EC) be the node local access counter
Let GLOBAL_Counter (GC) be the overall tree access counter
Let ET be the Endurance Time Deadline configured for migrating node between DRAM and NVM
Let S be the SPLAY Tree
Let K be a key accessed with R being the root of S
Thus:
K ∈ S
While Search K in S:
    if K is Leaf node:
        If K is already on DRAM:
            Do Nothing i.e. keep K on DRAM
        If K is on NVM:
            Reset EC
    if K is non-Leaf node:
        If K is already on DRAM:
            Do Nothing i.e. keep it on DRAM as it is a hot node
        If K is on NVM and If GC − EC > ET:
            Reset EC
    Perform Required Rotations
Let $N_m$ be the set of m nodes that become the new leaf nodes, then
    ∀ nodes ∈ N Algorithm 1: Memory-aware SPLAY Tree for Hybrid Memory Systems -continued Reset EC to GC
While Periodic Loop through SPLAY Tree Leaf Nodes after interval t time:
    ∀ K nodes ∈ N
        If GC − EC > ET and K is on DRAM:
            MIGRATE FROM DRAM TO NVM
        Else:
            Do Nothing i.e. keep it on DRAM (The object corresponding to this node might become hot soon)
INCREMENT EC
INCREMENT GC

---

In accordance with implementations of the present disclosure, and as depicted in Algorithm 1, each node N of the SPLAY tree S is associated with a respective endurance counter (EC), which is incremented each time the particular node is accessed. The SPLAY tree is associated with a global count (GC), which is incremented each time the SPLAY tree is accessed. An endurance time (ET) is provided, and is a threshold time, after which migration of an object associated with a node between DRAM/NVM can be executed. In some examples, the SPLAY tree (a node thereof) is accessed based on a key. In some examples, the key is the identifier associated with an object that is to be accessed. In some examples, a key K is received, and the SPLAY tree is searched for the node corresponding to the key. In some examples, the node corresponding to the key provides the memory address (as the node value) of the object that is to be accessed in the hybrid memory system.

In some implementations, the SPLAY tree S is searched for the key K (i.e., searched for a node corresponding to the key). In some examples, if the node corresponding to the key is a leaf node, the object corresponding to the node stays on DRAM, if already stored on DRAM, but, if stored on NVM, the EC of the node is reset (e.g., EC of the node corresponding to the key is set equal to 0). In some examples, if the node corresponding to the key is a not a leaf node (e.g., is a root node, or an intermediate node between the root node and leaf node(s)), the object corresponding to the node stays on DRAM, if already stored on DRAM. In this case, for example, the object corresponding to the non-leaf node can already be considered to be hot (relatively frequently accessed). If, however, the object corresponding to the node is on NVM, and a difference between the GC of the SPLAY tree and the EC of the particular node exceeds the ET, the EC of the node is reset (e.g., EC of the node corresponding to the key is set equal to 0). In some examples, if the object corresponding to the node is on NVM, but the difference between GC and EC is not greater than EC, the value of EC is not reset. In some implementations, the EC of the accessed node, and the GC of the SPLAY tree are incremented.

After the SPLAY tree is accessed based on the key, and the above-described checks are performed, the SPLAY tree is rotated. In some examples, the SPLAY tree can be rotated using an example rotation described herein (e.g., clock-wise, double zig-zag, simple zig-zag). Consequently, a set of leaf nodes $N_m$ is provided, and includes a set of m nodes populated by all new leaf nodes that result from the rotation (e.g., previous root node, and/or intermediate node(s) that become leaf nodes due to rotation). In some examples, for each node in $N_m$, a respective EC is set equal to GC. In some examples, EC is set equal to GC when a node becomes a leaf node, such that, for all the subsequent accesses to the particular leaf node, it can be determined when the object corresponding to the node needs to be migrated from DRAM to NVM, or vice versa.

In some implementations, leaf nodes of the SPLAY tree are periodically looped through to selectively migrate objects of one or more nodes between DRAM/NVM. In some examples, an interval t is provided, and upon expiration of the interval t, the leaf nodes of the SPLAY tree are reviewed to determine whether to migrate objects of nodes between DRAM/NVM. In some examples, this looping occurs at the predefined interval t regardless of what other action occurs. For example, the leaf nodes of the SPLAY tree will be looped through at interval t, even if no access has been made to the SPLAY tree, since the last loop through.

In some examples, each leaf node is reviewed to determine whether the object corresponding to the respective leaf node is on DRAM, and a difference between the GC of the SPLAY tree and the EC of the respective leaf node exceeds the ET. In some examples, if the object corresponding to the respective leaf node is on DRAM, and a difference between the GC of the SPLAY tree and the EC of the respective leaf node exceeds the ET, the object corresponding to the object corresponding to the leaf node is migrated from DRAM to NVM. In some examples, if the object corresponding to the respective leaf node is on DRAM, but a difference between the GC of the SPLAY tree and the EC of the respective leaf node does not exceed the ET, the object corresponding to the leaf node remains on DRAM. In some examples, if the object corresponding to the leaf node is on NVM, and the difference exceeds ET, the object corresponding to the leaf node stays on NVM.

Figure 7:
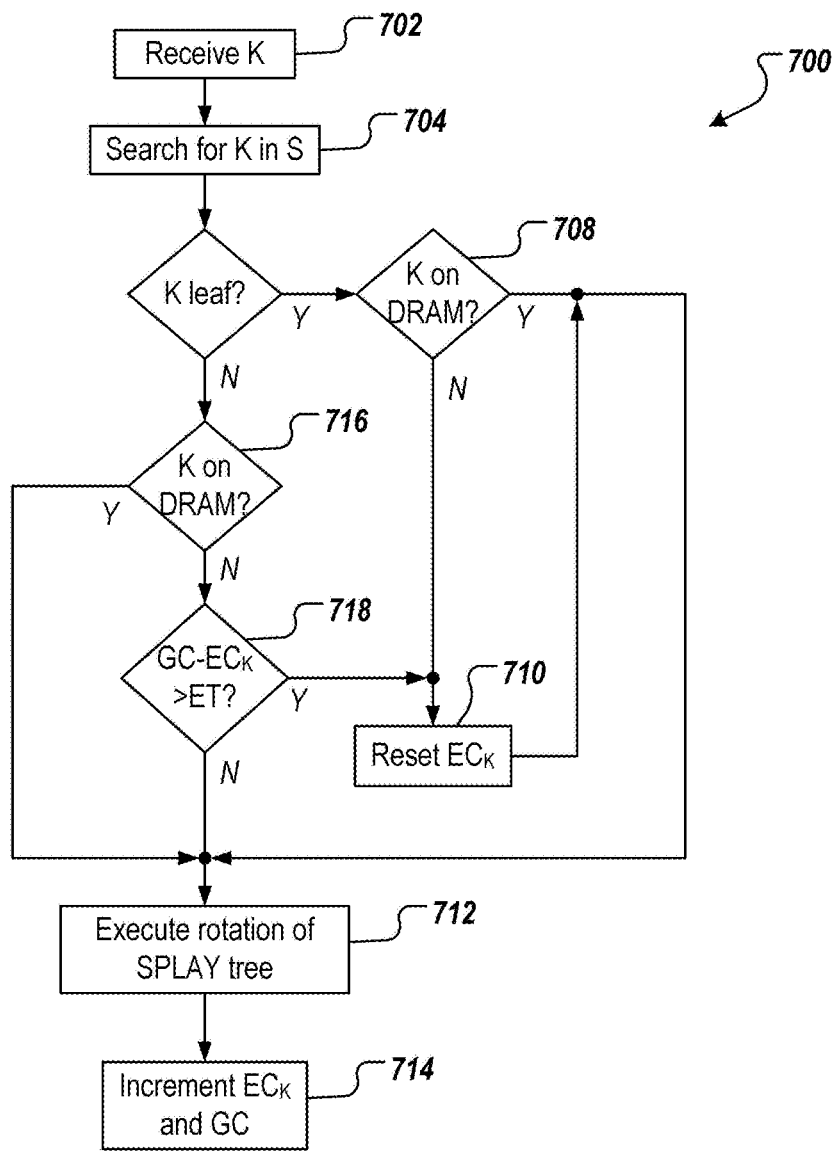
FIG. 7 depicts an example process that can be executed in accordance with implementations such as those of the present disclosure.

FIG. 7 depicts an example process 700 that can be executed in accordance with implementations of the present disclosure. In some implementations, the example process 700 may be performed using one or more computer-executable programs executed using one or more computing devices.

A key K is received (702). A SPLAY tree S is searched based on the key K (704). It is determined whether the key K is a leaf node (706). If the key K is a leaf node, it is determined whether the object corresponding to the key K is stored on DRAM (708). If the object corresponding to the key K is not stored on DRAM, the endurance counter of the key K ($EC_K$) (EC of the object) is reset (710) (e.g., $EC_K$ is set equal to zero), rotation of the SPLAY tree is executed (712), and both $EC_K$ and GC are incremented (714). If the object corresponding to the key K is stored on DRAM, rotation of the SPLAY tree is executed (712), and both $EC_K$ and GC are incremented (714).

If the key K is not a leaf node, it is determined whether the object corresponding to the key K is stored on DRAM (716). If the object corresponding to the key K is stored on DRAM, rotation of the SPLAY tree is executed (712), and both $EC_K$ and GC are incremented (714). If the object corresponding to the key K is not stored on DRAM, it is determined whether the difference between GC and $EC_K$ exceeds ET (718). If the difference between GC and $EC_K$ exceeds ET, $EC_K$ is reset (710) (e.g., $EC_K$ is set equal to zero), rotation of the SPLAY tree is executed (712), and both $EC_K$ and GC are incremented (714). If the difference between GC and $EC_K$ does not exceed ET, rotation of the SPLAY tree is executed (712), and both $EC_K$ and GC are incremented (714).

Figure 8:
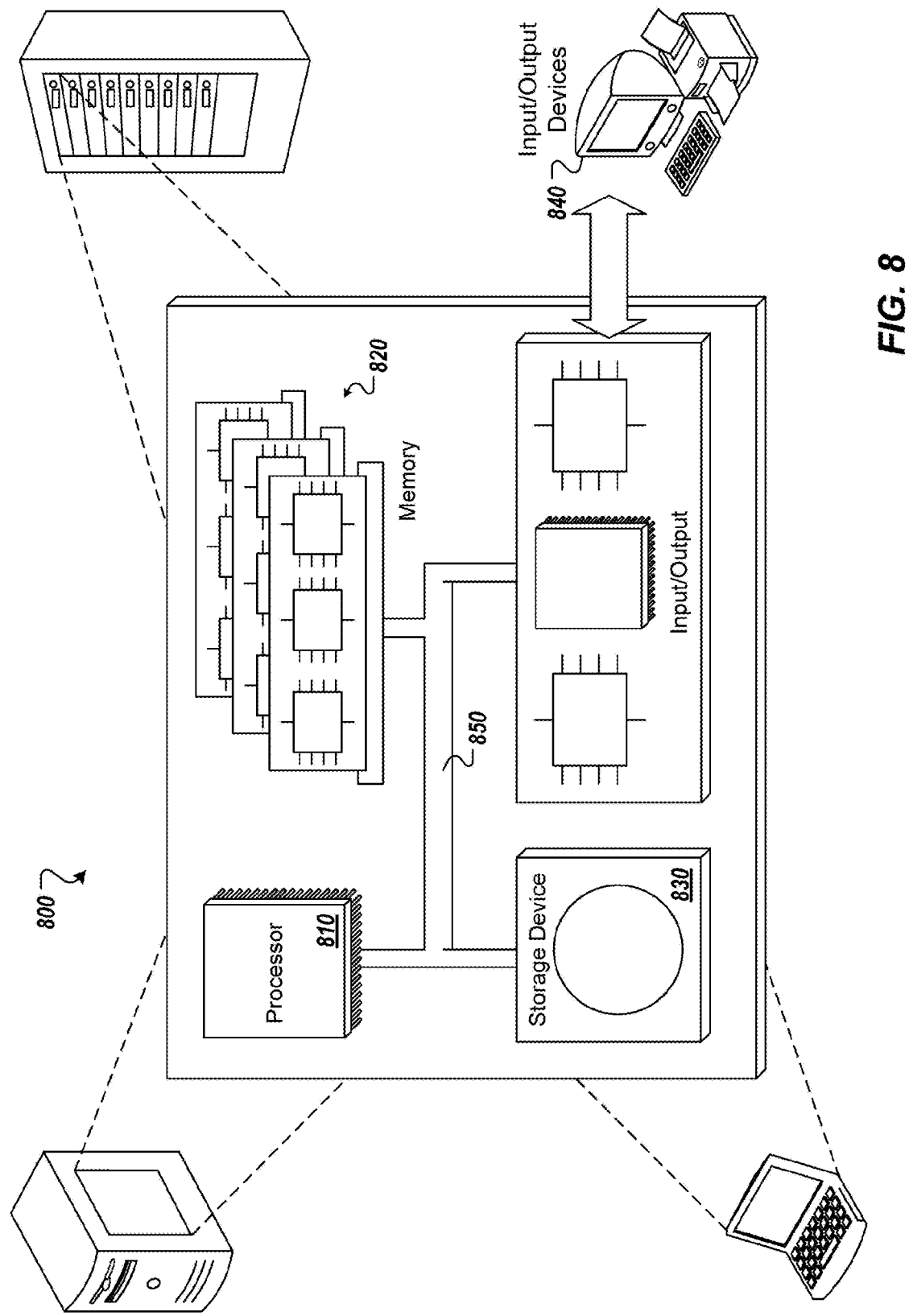
FIG. 8 is a schematic illustration of example computer systems that may be employed for implementations such as those of the present disclosure.

FIG. 8 depicts a schematic diagram of an example computing system 800. The system 800 may be used to perform the operations described with regard to one or more implementations of the present disclosure. For example, the system 800 may be included in any or all of the server components, or other computing device(s), discussed herein. The system 800 may include one or more processors 810, one or more memories 820, one or more storage devices 830, and one or more input/output (I/O) devices 840. The components 810, 820, 830, 840 may be interconnected using a system bus 850.

The processor 810 may be configured to execute instructions within the system 800. The processor 810 may include a single-threaded processor or a multi-threaded processor. The processor 810 may be configured to execute or otherwise process instructions stored in one or both of the memory 820 or the storage device 830. Execution of the instruction(s) may cause graphical information to be displayed or otherwise presented via a user interface on the I/O device 840. The processor(s) 810 may include the CPU 102.

The memory 820 may store information within the system 800. In some implementations, the memory 820 is a computer-readable medium. In some implementations, the memory 820 may include one or more volatile memory units. In some implementations, the memory 820 may include one or more non-volatile memory units. The memory 820 may include the hybrid main memory system 104.

The storage device 830 may be configured to provide mass storage for the system 800. In some implementations, the storage device 830 is a computer-readable medium. The storage device 830 may include a floppy disk device, a hard disk device, an optical disk device, a tape device, or other type of storage device. The I/O device 840 may provide I/O operations for the system 800. In some implementations, the I/O device 840 may include a keyboard, a pointing device, or other devices for data input. In some implementations, the I/O device 840 may include output devices such as a display unit for displaying graphical user interfaces or other types of user interfaces.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
   receiving, during execution of an application on simulated hardware, a key, the key corresponding to an object that is stored in a hybrid memory system being provided based on querying of an in-memory database;
   searching, by the one or more processors, a SPLAY tree based on the key to identify a node of the SPLAY tree, the SPLAY tree storing executable and linking format (ELF) data of the application provided in an ELF binary that is provided during compiling of the application, the ELF binary comprising function names that are required by the in-memory database for running a set of queries, only function names required for queries in the set of queries are retrieved from the ELF binary during execution of the application;
   determining, by the one or more processors, a type of memory that the object is stored on in the hybrid memory system, the type of memory comprising one of a first type of memory and a second type of memory;
   selectively adjusting, by the one or more processors, an endurance counter (EC) associated with the object based on a location of the node within the SPLAY tree, and the type of memory that the object is stored on in the hybrid memory system; and
   selectively migrating, by the one or more processors, the object between the first memory type and the second memory type based on the EC associated with the object.

2. The method of claim 1, wherein selectively migrating the object comprises:
   determining that the node is a leaf node, that the object is stored in the first memory type based on a node value of the node, and that a difference between a global counter (GC) of the SPLAY tree and the EC of the object exceeds an endurance threshold (ET), and in response:
   migrating the object from the first type of memory to the second type of memory in the hybrid memory system.

3. The method of claim 1, wherein the object is not migrated from the first type of memory to the second type of memory in the hybrid memory system, in response to determining one or more of that the node is a non-leaf node, that the object is stored in the second memory type based on a node value of the node, and that a difference between a global counter (GC) of the SPLAY tree and the EC of the object does not exceed an endurance threshold (ET).

4. The method of claim 1, wherein the EC of the object and a global counter (GC) of the SPLAY tree are incremented each time the SPLAY tree is searched for the key corresponding to the object.

5. The method of claim 1, wherein selectively adjusting the EC associated with the object comprises:
   determining that the node is a leaf node, and that the object is stored on the second memory type, and in response, resetting a value of the EC.

6. The method of claim 1, wherein the key comprises an object identifier assigned to the object, the object identifier uniquely identifying the object among a plurality of objects.

7. The method of claim 1, wherein the first memory type comprises dynamic random access memory (DRAM), and the second memory type comprises non-volatile memory (NVM).

8. A non-transitory computer-readable storage medium coupled to one or more processors and having instructions stored thereon which, when executed by the one or more processors, cause the one or more processors to perform operations comprising:
   receiving, during execution of an application on simulated hardware, a key, the key corresponding to an object that is stored in a hybrid memory system being provided based on querying of an in-memory database;
   searching a SPLAY tree based on the key to identify a node of the SPLAY tree, the SPLAY tree storing executable and linking format (ELF) data of the application provided in an ELF binary that is provided during compiling of the application, the ELF binary comprising function names that are required by the in-memory database for running a set of queries, only function names required for queries in the set of queries are retrieved from the ELF binary during execution of the application;
determining a type of memory that the object is stored on in the hybrid memory system, the type of memory comprising one of a first type of memory and a second type of memory;
selectively adjusting an endurance counter (EC) associated with the object based on a location of the node within the SPLAY tree, and the type of memory that the object is stored on in the hybrid memory system; and
selectively migrating the object between the first memory type and the second memory type based on the EC associated with the object.

9. The computer-readable storage medium of claim 8, wherein selectively migrating the object comprises:
determining that the node is a leaf node, that the object is stored in the first memory type based on a node value of the node, and that a difference between a global counter (GC) of the SPLAY tree and the EC of the object exceeds an endurance threshold (ET), and in response:
migrating the object from the first type of memory to the second type of memory in the hybrid memory system.

10. The computer-readable storage medium of claim 8, wherein the object is not migrated from the first type of memory to the second type of memory in the hybrid memory system, in response to determining one or more of that the node is a non-leaf node, that the object is stored in the second memory type based on a node value of the node, and that a difference between a global counter (GC) of the SPLAY tree and the EC of the object does not exceed an endurance threshold (ET).

11. The computer-readable storage medium of claim 8, wherein the EC of the object and a global counter (GC) of the SPLAY tree are incremented each time the SPLAY tree is searched for the key corresponding to the object.

12. The computer-readable storage medium of claim 8, wherein selectively adjusting the EC associated with the object comprises:
determining that the node is a leaf node, and that the object is stored on the second memory type, and in response, resetting a value of the EC.

13. The computer-readable storage medium of claim 8, wherein the key comprises an object identifier assigned to the object, the object identifier uniquely identifying the object among a plurality of objects.

14. The computer-readable storage medium of claim 8, wherein the first memory type comprises dynamic random access memory (DRAM), and the second memory type comprises non-volatile memory (NVM).

15. A system, comprising:
a computing device; and
a computer-readable storage device coupled to the computing device and having instructions stored thereon which, when executed by the computing device, cause the computing device to perform operations comprising:
receiving, during execution of an application on simulated hardware, a key, the key corresponding to an object that is stored in a hybrid memory system being provided based on querying of an in-memory database;
searching a SPLAY tree based on the key to identify a node of the SPLAY tree, the SPLAY tree storing executable and linking format (ELF) data of the application provided in an ELF binary that is provided during compiling of the application, the ELF binary comprising function names that are required by the in-memory database for running a set of queries, only function names required for queries in the set of queries are retrieved from the ELF binary during execution of the application;
determining a type of memory that the object is stored on in the hybrid memory system, the type of memory comprising one of a first type of memory and a second type of memory;
selectively adjusting an endurance counter (EC) associated with the object based on a location of the node within the SPLAY tree, and the type of memory that the object is stored on in the hybrid memory system; and
selectively migrating the object between the first memory type and the second memory type based on the EC associated with the object.

16. The system of claim 15, wherein selectively migrating the object comprises:
determining that the node is a leaf node, that the object is stored in the first memory type based on a node value of the node, and that a difference between a global counter (GC) of the SPLAY tree and the EC of the object exceeds an endurance threshold (ET), and in response:
migrating the object from the first type of memory to the second type of memory in the hybrid memory system.

17. The system of claim 15, wherein the object is not migrated from the first type of memory to the second type of memory in the hybrid memory system, in response to determining one or more of that the node is a non-leaf node, that the object is stored in the second memory type based on a node value of the node, and that a difference between a global counter (GC) of the SPLAY tree and the EC of the object does not exceed an endurance threshold (ET).

18. The system of claim 15, wherein the EC of the object and a global counter (GC) of the SPLAY tree are incremented each time the SPLAY tree is searched for the key corresponding to the object.

19. The system of claim 15, wherein selectively adjusting the EC associated with the object comprises:
determining that the node is a leaf node, and that the object is stored on the second memory type, and in response, resetting a value of the EC.

20. The system of claim 15, wherein the key comprises an object identifier assigned to the object, the object identifier uniquely identifying the object among a plurality of objects.

* * * * *